(12) United States Patent
Chan et al.

(10) Patent No.: US 12,381,716 B2
(45) Date of Patent: Aug. 5, 2025

(54) OPTIMIZED KEY MANAGEMENT FOR DATA SIGNING SYSTEMS

(71) Applicant: ARRIS Enterprises LLC, Suwanee, GA (US)

(72) Inventors: Tat Keung Chan, San Diego, CA (US); Alexander Medvinsky, San Diego, CA (US); Ting Yao, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 203 days.

(21) Appl. No.: 18/090,851

(22) Filed: Dec. 29, 2022

(65) Prior Publication Data

US 2023/0216662 A1    Jul. 6, 2023

Related U.S. Application Data

(60) Provisional application No. 63/294,845, filed on Dec. 30, 2021.

(51) Int. Cl.
*H04L 29/00* (2006.01)
*H04L 9/08* (2006.01)
*H04L 9/32* (2006.01)

(52) U.S. Cl.
CPC .......... *H04L 9/0825* (2013.01); *H04L 9/0877* (2013.01); *H04L 9/3247* (2013.01); *H04L 9/3263* (2013.01)

(58) Field of Classification Search
CPC ... H04L 9/0825; H04L 9/0877; H04L 9/3247; H04L 9/3263; H04L 9/3268; H04L 9/0822; H04L 9/0897
See application file for complete search history.

(56) References Cited

U.S. PATENT DOCUMENTS

| | | | | |
|---|---|---|---|---|
| 7,096,355 B1* | 8/2006 | Marvit | .................. | H04L 63/062 713/168 |
| 8,316,237 B1* | 11/2012 | Felsher | ................. | H04L 63/061 380/282 |
| 8,972,733 B1* | 3/2015 | Wu | .......................... | H04L 9/40 713/171 |
| 9,009,480 B1* | 4/2015 | Wu | ....................... | H04L 63/045 713/171 |
| 9,037,865 B1* | 5/2015 | Gopalakrishna | ..... | G06Q 20/363 713/184 |
| 9,076,018 B2* | 7/2015 | Johnson | .................... | H04L 9/08 |

(Continued)

*Primary Examiner* — Don G Zhao
(74) *Attorney, Agent, or Firm* — Chernoff, Vilhauer, McClung & Stenzel, LLP

(57) ABSTRACT

A system and method for providing a providing security credential is disclosed. In one embodiment, the method comprises accepting a request to generate at least one key in an online data signing system; generating, in a hardware security module communicatively coupled to the online data signing system, a first key $K_1$ as a temporary object; encrypting, by the hardware security module, the first key $K_1$ according to a wrapping key Kw to produce an encrypted first key $E_{K_w}[K_1]$; storing the encrypted first key; and providing a second key $K_2$ associated with the first key $K_1$ to a user device communicatively coupled to the online data signing system.

19 Claims, 14 Drawing Sheets

(56) References Cited

U.S. PATENT DOCUMENTS

| | | | | |
|---|---|---|---|---|
| 9,608,809 B1* | 3/2017 | Ghetti | | G06F 21/602 |
| 9,813,414 B2* | 11/2017 | Camenisch | | H04L 63/083 |
| 9,984,238 B1* | 5/2018 | Roth | | H04L 67/568 |
| 10,742,634 B1* | 8/2020 | Shahbazi | | H04W 12/77 |
| 11,303,437 B2* | 4/2022 | Bursell | | H04L 9/0838 |
| 11,336,425 B1* | 5/2022 | Lablans | | H04J 13/0029 |
| 11,411,728 B2* | 8/2022 | Bursell | | H04L 9/0877 |
| 11,411,938 B2* | 8/2022 | Bursell | | H04L 9/0822 |
| 11,424,920 B2* | 8/2022 | Bursell | | H04L 9/0861 |
| 11,436,352 B2* | 9/2022 | Bursell | | H04L 9/0869 |
| 2001/0002486 A1* | 5/2001 | Kocher | | G06F 21/755 |
| | | | | 713/171 |
| 2002/0129238 A1* | 9/2002 | Toh | | H04L 63/061 |
| | | | | 713/153 |
| 2007/0192250 A1* | 8/2007 | Nakamoto | | H04L 9/0861 |
| | | | | 705/50 |
| 2008/0077794 A1* | 3/2008 | Arnold | | H04L 9/3242 |
| | | | | 713/172 |
| 2008/0095368 A1* | 4/2008 | Lida | | H04L 63/0442 |
| | | | | 380/259 |
| 2009/0262942 A1* | 10/2009 | Maeda | | H04L 9/083 |
| | | | | 380/278 |
| 2010/0031014 A1* | 2/2010 | Senda | | H04N 1/32144 |
| | | | | 713/150 |
| 2010/0153735 A1* | 6/2010 | Guenthner | | G06F 21/34 |
| | | | | 713/183 |
| 2011/0012711 A1* | 1/2011 | Abe | | G07F 7/1008 |
| | | | | 340/5.82 |
| 2012/0257747 A1* | 10/2012 | Liardet | | H04L 9/004 |
| | | | | 380/46 |
| 2012/0278869 A1* | 11/2012 | Guccione | | H04L 67/55 |
| | | | | 726/5 |
| 2013/0047057 A1* | 2/2013 | Resch | | H04L 9/321 |
| | | | | 714/799 |
| 2013/0124866 A1* | 5/2013 | Farrugia | | H04L 9/0825 |
| | | | | 713/171 |
| 2013/0275744 A1* | 10/2013 | Resch | | H04L 67/10 |
| | | | | 713/150 |
| 2013/0326221 A1* | 12/2013 | Murphy | | H04L 51/18 |
| | | | | 713/168 |
| 2014/0040984 A1* | 2/2014 | Mackler | | G06F 21/445 |
| | | | | 726/3 |
| 2014/0164776 A1* | 6/2014 | Hook | | G06F 21/6218 |
| | | | | 713/171 |
| 2014/0173704 A1* | 6/2014 | Adams | | H04L 63/06 |
| | | | | 726/5 |
| 2015/0312227 A1* | 10/2015 | Follis | | H04L 9/3247 |
| | | | | 713/176 |
| 2015/0358161 A1* | 12/2015 | Kancharla | | H04L 9/3234 |
| | | | | 713/164 |
| 2015/0358313 A1* | 12/2015 | Hussain | | H04L 63/0823 |
| | | | | 713/173 |
| 2016/0065366 A1* | 3/2016 | Camenisch | | H04L 9/0863 |
| | | | | 380/44 |
| 2016/0164849 A1* | 6/2016 | Smith | | H04L 9/3263 |
| | | | | 713/155 |
| 2016/0239929 A1* | 8/2016 | Hudson | | G06Q 50/06 |
| 2016/0285872 A1* | 9/2016 | Polar | | G06Q 50/06 |
| 2017/0039397 A1* | 2/2017 | Furuhashi | | G06F 21/62 |
| 2017/0052907 A1* | 2/2017 | Price, Jr. | | G06F 21/78 |
| 2017/0155634 A1* | 6/2017 | Camenisch | | H04L 9/085 |
| 2017/0257212 A1* | 9/2017 | Domosi | | H04L 9/06 |
| 2017/0272472 A1* | 9/2017 | Adhar | | G06F 21/602 |
| 2018/0211264 A1* | 7/2018 | Micali | | H04L 9/3247 |
| 2019/0028273 A1* | 1/2019 | Harras | | G06F 21/606 |
| 2021/0173944 A1* | 6/2021 | Mastenbrook | | G06F 21/70 |
| 2021/0218556 A1* | 7/2021 | Mastenbrook | | H04L 9/0841 |
| 2021/0218558 A1* | 7/2021 | Mastenbrook | | H04L 9/3263 |
| 2022/0138286 A1* | 5/2022 | Zage | | H04L 63/0428 |
| | | | | 726/26 |

* cited by examiner

OPTIMIZED KEY MANAGEMENT FOR DATA SIGNING SYSTEMS

CROSS-REFERENCE TO RELATED APPLICATIONS

The present application claims priority to U.S. Provisional App. No. 63/294,845 filed Dec. 30, 2021, the content of which is incorporated herein by reference in its entirety.

BACKGROUND

1. Field

The present invention relates to systems and methods for signing data for use on devices, and in particular to a system and method for providing distributed data signing services.

2. Description of the Related Art

It is beneficial in some circumstances to provide data to devices which have already been distributed to end users (e.g. fielded devices). Such data may be needed to update the device(s) to newer configurations or to perform additional functions, to ameliorate software "bugs" or other issues, or to simply replace data already resident in the device that may have been compromised. Such data may include software instructions (e.g. code) to update fielded devices by providing data such as software code to those devices remotely.

One of the problems with the remote downloading of such data to fielded devices is that the data may be from an unauthorized source. An entity providing the data to the fielded devices may pose as a legitimate source of the data, yet provide data that is designed to compromise the security or functionality of the device. For example, the user of the device may be misled into believing that their device needs a software update in order to function properly, and may be provided a bogus uniform resource location (URL) from which to download the software update. If the user downloads and installs the software update from the bogus URL, the code that is downloaded may include a virus or other malware that negatively affects the operation of the device, perhaps compromising all of the data (including the user's private information) that was stored by the device before it was infected.

To prevent the foregoing problems, code signing techniques can be used to digitally sign data such as executables and scripts. Such signatures confirm the identity of the author of the data and guarantee that the data has not been altered or otherwise corrupted since it was signed. Most code signing paradigms provide a digital signature mechanism to verify the identity of the author of the data or build system, and a checksum to verify that the data object has not been modified. Such code signing paradigms typically use authentication mechanisms such as public key infrastructure (PKI) technologies, which rely on data publishers securing their private keys against unauthorized access. The public key used to authenticate the data signature should be traceable back to a trusted root certificate authority (CA). If the data signature is traced to a CA that the device user trusts, the user is presumed to be able to trust the legitimacy and authorship of the data that is signed with a key generated by that CA.

In such code signing systems, the signing and encryption keys are typically stored in a secure hardware security module (HSM). Key generation and clear key handling require multiple person integrity to ensure security and an audit trail. Such multi-person audited events are called "key ceremonies." If multiple HSMs are used in different environments (development, quality assurance, and production, for example), backing up and restoring keys stored in the HSMs are needed to propagate the new keys to all HSMs, especially if they are on different networks. Otherwise, repeated key ceremonies need to be performed for each HSM. All these activities are labor intensive.

What is needed is a system and method to create and back up such keys.

SUMMARY

To address the requirements described above, this document discloses a system and method for providing a security credential, for example a credential that can be used to sign, encrypt, or decrypt data. In one embodiment, the method comprises accepting a request to generate at least one key in an online data signing system; generating, in a hardware security module communicatively coupled to the online data signing system, a first key $K_1$ as a temporary object; encrypting, by the hardware security module, the first key $K_1$ according to a wrapping key Kw to produce an encrypted first key $E_{Kw}[K_1]$; storing the encrypted first key; and providing a second key $K_2$ associated with the first key $K_1$ to a user device communicatively coupled to the online data signing system. In another embodiment, the method further comprises linking, in the online data signing system, a configuration defined by an administrator to the encrypted first key $E_{Kw}[K_1]$; accepting, in the online data signing system, a request from the user device to perform a cryptographic operation on data according to the configuration; retrieving the encrypted first key from storage; decrypting, in the hardware security module, the encrypted first key according to the wrapping key Kw to recover the first key $K_1$ as a further temporary object; performing the cryptographic operation on the data in the online data signing system according to the first key $K_1$; and providing a result of the cryptographic operation to the user device.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described below is a system and method of providing keys that can be used for security credentials. In this system and method, new keys are generated in the HSM itself and are encrypted (e.g. wrapped) for backup external to the HSM. To achieve this, the ODSS 100 includes additional functionality to generate a new key as a session object in an HSM partition of the system. The new key is wrapped with a global wrapping key and stored to the database of the data signing system. The keys are then unwrapped to the HSM when needed. For asymmetric keys (e.g., RSA or ECDSA, El Gamal, and NTRU), the public key associated with the private key is permitted to be downloaded by the client. For symmetric keys, the same symmetric key is permitted to be downloaded, preferably encrypted with user's public key. For the case where a CVC (Code Verification Certificate) needs to be issued based on the public key, a CSR (Certificate Signing Request) is generated and allowed to be downloaded.

Data Signing System

Figure 1:
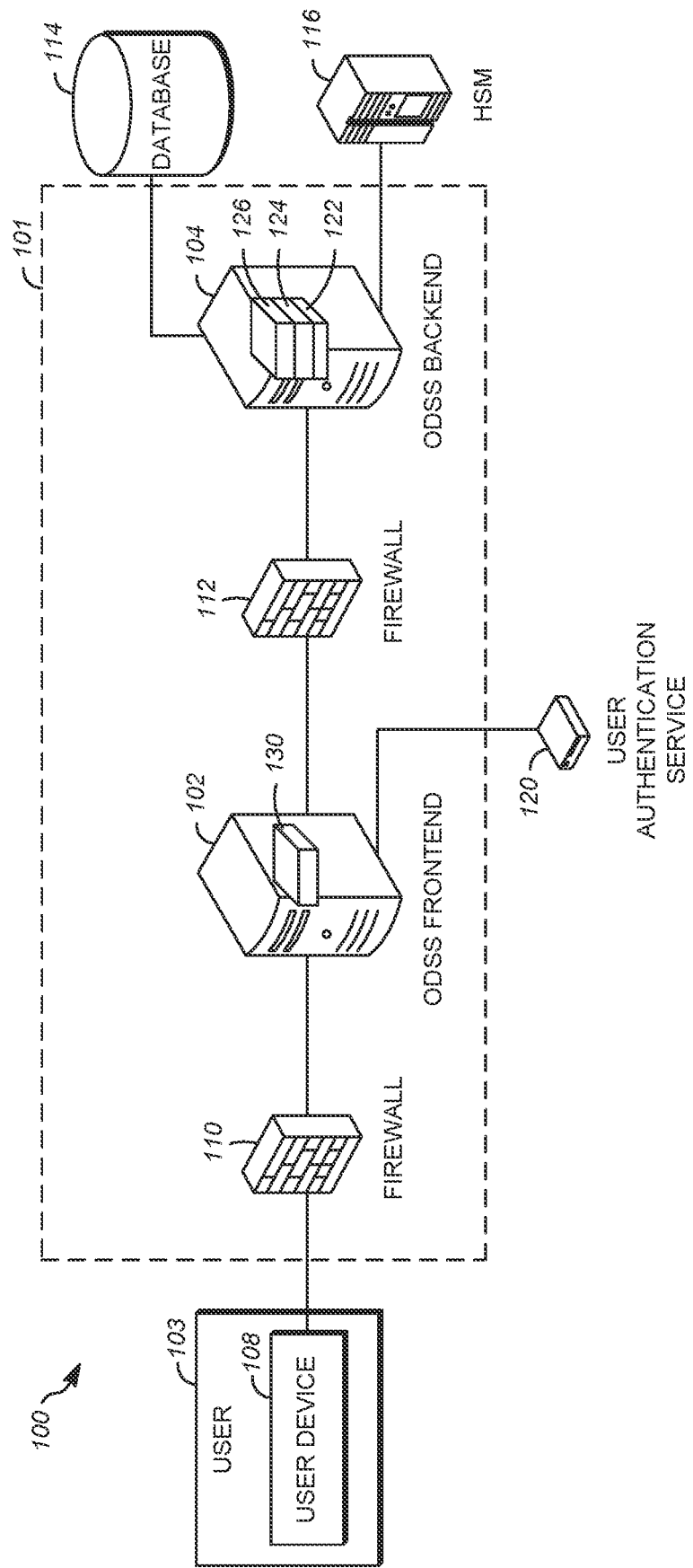
FIG. 1 is a diagram depicting one embodiment of an online data signing system (ODSS)

FIG. 1 is a diagram depicting an exemplary ODSS 100. The ODSS frontend 102 is a Graphic User Interface (GUI) layer that is the presentation layer for the ODSS 100. The ODSS frontend 102 is hosted on a server that is behind a firewall 110 to protect against unnecessary or unauthorized access. The ODSS frontend 102 comprises a web portal interface 130 that implements the presentation (e.g. "look and feel") of functionality of the ODSS 100 to the user 103. As described below, users 103 may include human users 103H, which comprise a human or person 106 and a human user device 108H or a machine user 103M, which comprises a machine user device 108M. Hereinafter, the term user 103 is used to refer collectively to either a human user 103H or a machine user 103M, and the term user device 108H is used to refer collectively to either a human user device 108H or a machine user device 108M. Preferably, the ODSS frontend 102 does not enforce signing permissions, perform any signing or key generation activities, or define the hierarchy of the entities discussed below or how the access to such entities are managed. Rather, the ODSS frontend 102 controls access to the ODSS backend 104, and the ODSS backend 104 performs the functionality of enforcing signing permissions, performing signing or key generation activities, and/or defining the hierarchy of the entities discussed below and how the access to such entities are managed.

The ODSS frontend 102 also has access to a server operating according to a user authentication service such as an Lightweight Directory Access Protocol (LDAP) server to authenticate valid users 103. The ODSS 100 maintains its own database of user 106 accounts, and the ODSS User authentication service 120 is used when a user is added to the system for the first time and a user account is created and stored in the ODSS database 114.

To access the ODSS 100, the user 103 must specify user credentials, such as a password. Those credentials are used to validate every user session between the user 103 and the ODSS frontend 102. The ODSS 100 forbids access to users 106 unless valid credentials are provided and favorably compared to analogous information specified in ODSS database 114. Hence, only valid ODSS 100 users 103 having credentials matching those stored in the ODSS database 114) can access ODSS 100.

The ODSS backend 104 is behind a second firewall 112 and provides protected access to the ODSS database 114 and the data signing keys that are stored in an ODSS hardware security module (HSM) 116. It is used to access the ODSS hierarchical entities discussed below and to look up user permissions for different data signing configurations and to perform all authorized crypto operations. The ODSS backend 104 connects to ODSS HSM 116 and using the ODSS HSM 116, performs operations such as data signing, encryption, and decryption. The ODSS backend 104 may implement a plurality of software layers including, from the top software layer to the bottom software layer, an ODSS Service Layer 126, a Business Logic Layer (BLL) 122 and a Data Access Layer (DAL) 124.

Although the foregoing discloses an ODSS 100 having a ODSS frontend 102 and an ODSS backend 104, the ODSS 100 may be implemented with a single server performing the functions of both the ODSS frontend 102 and the ODSS backend 104, albeit, with reduced security.

The ODSS Service Layer 126 is the heart of ODSS 100 and is comprised of a plurality of signing/generation operations that are supported by ODSS 100. Depending on what type of service is needed, a specific dynamically loadable library (DLL) required for that service may be injected into memory to perform the operation.

The Business Logic Layer (BLL) 122 specifies which users 106 have access to the ODSS 100 and the conditions on which access is granted or revoked. The BLL 122 also takes care of other business logic such as updating audit logs and generating reports.

The Data Access Layer (DAL) layer 124 provides access to the ODSS database 114 and enables queries to access, add or remove entries in the ODSS database 114.

Manual Interactive Web Processes

Figure 2:
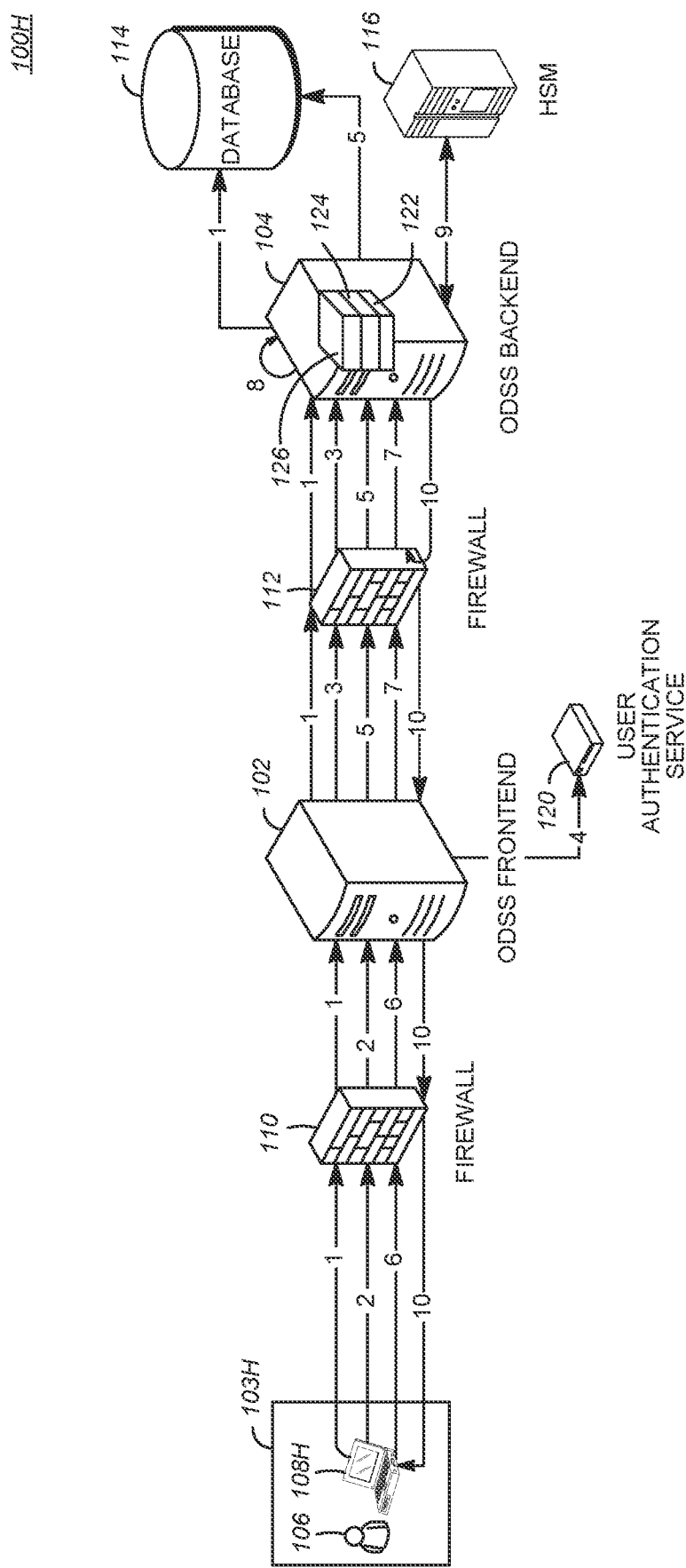
FIG. 2 is a diagram illustrating one embodiment of a manual process by which the designated users of the ODSS is used to sign data.

In a first embodiment, a manual data signing generation functionality is provided to users 103. This embodiment is illustrated in FIG. 2, which illustrates a human user ODSS 100H. This embodiment implements a manual process by which the designated human users 103H of the ODSS 100H sign data using a human user device 108H.

Step 1: In this embodiment, the user 103 is a human user 103H that comprises a person 106 and a human user device 108H. Before a human user 103H can access the ODSS 100, an administrator of the ODSS 100 adds the user's identity such as a username to the ODSS configurations (further described below) in ODSS database 114 corresponding to software development projects the user 106 has been assigned. This can be accomplished, for example, using an administrator client device analogous to the illustrated human user device 108H.

Step 2: The human user 103H interacts with the ODSS frontend 102 via a web browser executing on a human user device 108H. Preferably, this interaction is performed using the secure hypertext transfer protocol (HTTPS).

Step 3: The ODSS frontend 102 utilizes appropriate services provided by the ODSS backend 104 over a simple object access protocol (SOAP) interface.

Step 4: When the human user 103H logs in, the ODSS frontend 102 validates the user credentials (e.g., username and password) received from the human user device 108H against data stored in the ODSS User authentication service 120 and if the user credentials compare favorably with the data stored in the ODSS User authentication service 120, the human user 103H can access the ODSS 100. If not, the human user 103H is denied access to the ODSS 100.

Step 5: Based on logged in user's credential, the ODSS frontend 102 invokes BLL 122 of the ODSS backend 104 to look up user permissions to determine which configurations the logged in human user 103H has access to and presents only those configurations to the human user 103H.

Step 6: Using the human user device 108H, the human user 103H then selects one or more of the presented configurations and uploads an input/request file as well as other request parameters to ODSS frontend 102.

Step 7: The ODSS frontend 102 passes the uploaded input/request file, selected configuration, and operational details such as which signing key, signature algorithm, and/or digital signature format to use to ODSS backend 104.

Step 8: The ODSS backend 104, upon receiving request from the ODSS frontend 102, invokes the ODSS Service Layer 126.

Step 9: The invoked ODSS Service Layer 126 accesses the ODSS HSM 116 to get the keys that are needed to sign the data in the input/request file, and retrieves configuration details from ODSS database 114. In one embodiment, the ODSS Service Layer 126 also parses the input file. This is required because for some signing operations, the input file must follow a particular format, and this operation verifies that the input file is using the proper format, then retrieves certain information from certain portion(s) of input file. The ODSS Service Layer 126 then performs appropriate operations such as data signing, encryption, and decryption on the relevant portions of the input file. Based on these operations, the ODSS Service Layer 126 generates an output response file having the signed data and other information.

Step 10: The ODSS Service Layer 126 returns the generated output/response to the ODSS frontend 102. The ODSS frontend 102 generates a file from the generated output/response administrator client device, subsequently forwarded to the human user 103H.

Automated Machine-to-Machine Interface

Figure 3:
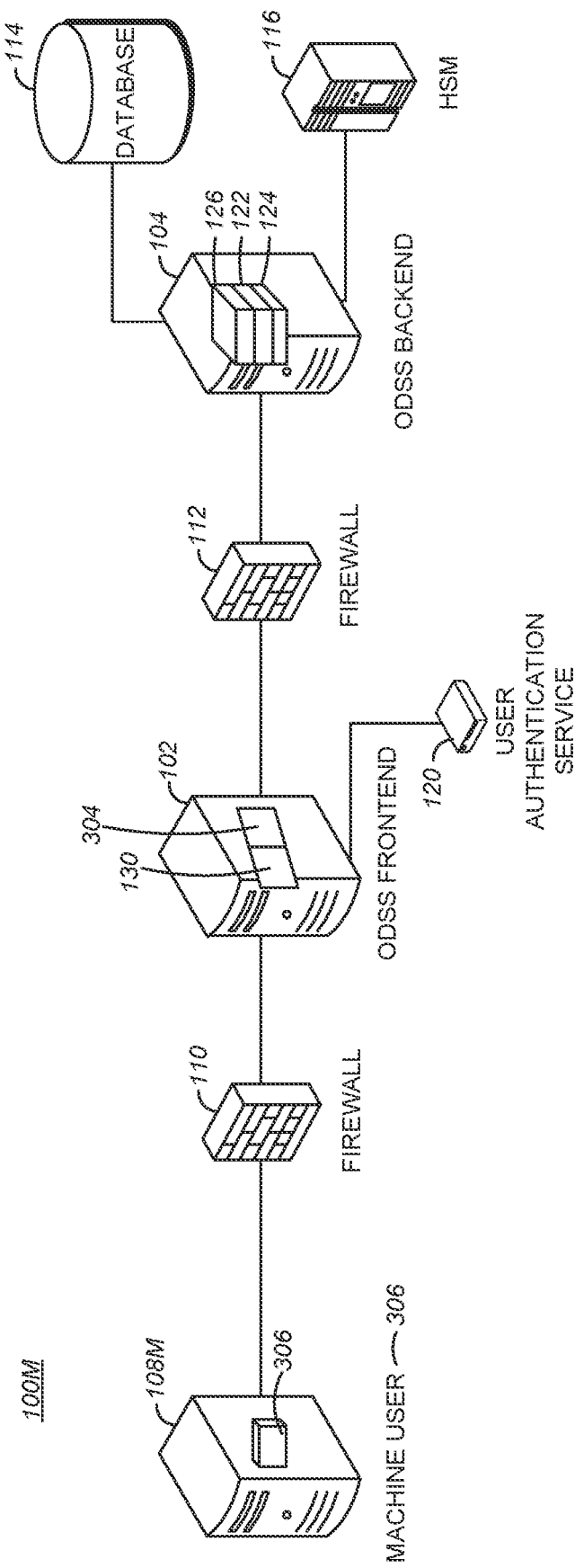
FIG. 3 is a diagram of an automated version of the ODSS.

Another embodiment provides the automatic signing generation functionality to customers such that they can integrate this in their automated build process. In order to provide such a mechanism a machine-to-machine interface must be provided over Internet such that ODSS machine user client device 108M can automatically connect with our ODSS 100 Service to request data signing FIG. 3 is a diagram of an automated version of the ODSS 100M. As described below, the automated ODSS 100M uses same ODSS architecture depicted in FIG. 1, and can be used to support automated online requests from a ODSS machine user 103M implemented by a machine user device 108M associated with an internet protocol (IP) address. In this case, the IP address is treated as a virtual user of the ODSS 100M and can obtain the same kinds of permissions as are normally assigned to a human user 103H.

The automated ODSS 100M introduces two additional components: an ODSS client tool 306 implemented on an ODSS machine user device 108M and an ODSS web service 304. The ODSS Web Service 304 provides an interface to the ODSS 100 infrastructure elements described above.

The automated ODSS 100 implements a machine-to-machine interface that comprises ODSS client tool 306, ODSS Web Service 304 and ODSS backend 104. ODSS backend 104 functionality is shared between the manual user access modes described with respect to FIG. 2 (e.g. graphical user interface or GUI), and the machine-to-machine interface described further below.

ODSS Client

The ODSS client tool 306 that is executed in the ODSS machine user 103M environment handles any pre-processing and post-processing of image files of the data to be signed so the ODSS machine user 103M does not need to know the details of the signing operations being performed on such data. The ODSS client tool 306 communicates with the ODSS Web Service 304 which runs on ODSS frontend 102.

ODSS Web Service

The ODSS web service 304 is hosted on ODSS frontend 102 behind firewall 110 to protect against unauthorized access. The ODSS Web Service 304 performs authorization and authentication functionality of ODSS 100M. The ODSS web service 304 allows the ODSS machine user 103M, through the ODSS frontend 102 to request data signing, encryption and decryption without a human interface or human user 103H involvement.

ODSS Machine-to-Machine Process

Before an ODSS machine user 103M can access ODSS 100, the ODSS administrator creates a user (machine) account in the ODSS User authentication service 120 and personalizes a hardware cryptographic token for that ODSS machine user 103M (by for example creating a digital certificate and private key on that token which identify a data signing client host where ODSS client tool 306 is executing). The hardware cryptographic token can be used for ODSS machine user device 108M authentication in a number of ways.

Once the ODSS machine user 103M is authenticated, the ODSS Web Service 304 invokes the ODSS backend 104 to retrieve machine authorization permission data that is used to determine whether the requesting machine account is authorized to perform the requested operation. Such authorization permission data is stored in the ODSS database 114.

Upon receiving the request from ODSS Web Service 304, the ODSS backend 104 invokes the ODSS Service Layer 126, which accesses the ODSS HSM 116 to retrieve the keys required for the data signing process and also retrieve configuration details for the configurations that the machine user 103M is authorized to access or control. The ODSS backend 104 then optionally parses the input file provided by the ODSS machine user 103M above. The ODSS backend 104 then performs the appropriate action such as signing the data or other data in the input file, and/or encryption and decryption of data or keys. Based on the results of the action, the ODSS Service Layer 126 generates a response having the output or results of the requested action. This output may comprise, for example, the signed data, and/or encrypted or decrypted keys. The ODSS Service Layer 126 later returns this output to ODSS Web Service 304 executing on the ODSS frontend 102. The ODSS Web Service 304 returns the generated output to ODSS client tool 306. If no output is available, the ODSS web service 304 returns an error code.

The ODSS 100M is secured with multiple layers of protection against unauthorized access and protection of private keys including those used to sign the data. Such protection includes:

ODSS machine user 103M authentication with a hardware crypto token. The hardware crypto token contains a certificate and a corresponding private key and is associated with a username and password. The private key may be used to decrypt a locally stored user password or for direct authentication to the ODSS.

Role-based and very flexible user authorization which allows for different roles including administrator, manager, or user. Machine users 103M can only be assigned a "user" role.

The ODSS backend 104 deployment in a secure area behind second firewall 112 which allows access to the ODSS backend 104 only from the ODSS frontend 102 ODSS.

Private keys are stored in ODSS HSM 116, and those keys cannot be retrieved in clear form. PKCS11 is an example of a standards-based HSM interface which may be used for data signing, encryption, and decryption operations, thus never exposing the private keys in clear form.

Critical operations are checked against authorization rules (stored in the ODSS database 114) and performed only if they are permitted with those rules.

Certificates stored on hardware crypto tokens are generated with the IP address of the ODSS machine user 103M as a unique user identifier in the CommonName attribute of each certificate. Optionally, a client is not permitted to be behind proxy settings, so that the ODSS machine user 103M IP address is the actual address and not modified as seen by the server. IP addresses may be blocked from accessing ODSS 100 configurations and entities based on the geographic location associated with that IP address.

Management of Users

As described above, there is a need to provide a framework that allows different organizations or companies to structure their data signing permission needs as they see fit or to safely permit data signing by other independent organizations that publish the data to their customers. This is accomplished by defining a hierarchical organization of a plurality of entities within the ODSS, and managing eligibility to designate users to access those entities via accounts granting different eligibility status, as further described below.

As described above, the ODSS system 100 has two types of users 103: human users 103H and machine users 103M. To manage those users, we define what "roles" can be assigned to these users. Such roles include administrator roles, manager roles, and user roles. Both human users 103H and machine users 103M may have "user" roles in the ODSS system 100, while only human users 103H can have "manager" or "administrator" roles.

An account represents the relation between a company and an ODSS entity and all of the children of the ODSS entity. An account is one of two account types, including an owner account type, and a participant account type. Granting an account provides eligibility to grant permission of a user 103 to access an ODSS entity (and those hierarchically below that entity), but not permission itself. The permission is instead granted to the eligible user 103. A company may have multiple accounts for different ODSS entities, as further discussed below.

The top level ODSS entity (the application platform entity discussed below) can be owned by just one company through an owner account. This is enforced by the ODSS administrator granting an owner account to only one company. However, a company may have a participant account on the two top ODSS entity levels (the application platform entity and the project entity). This structure allows different ODSS entities to be accessible by multiple companies by the granting of the particular type of an account (owner or participant).

Only human users 103H from an owner account can be assigned a manager role 506, and only users 103 whose company has an account (either an owner account or a participant account) can be granted permission to sign data to be installed on devices associated with an entity associated with that account.

Figure 4:
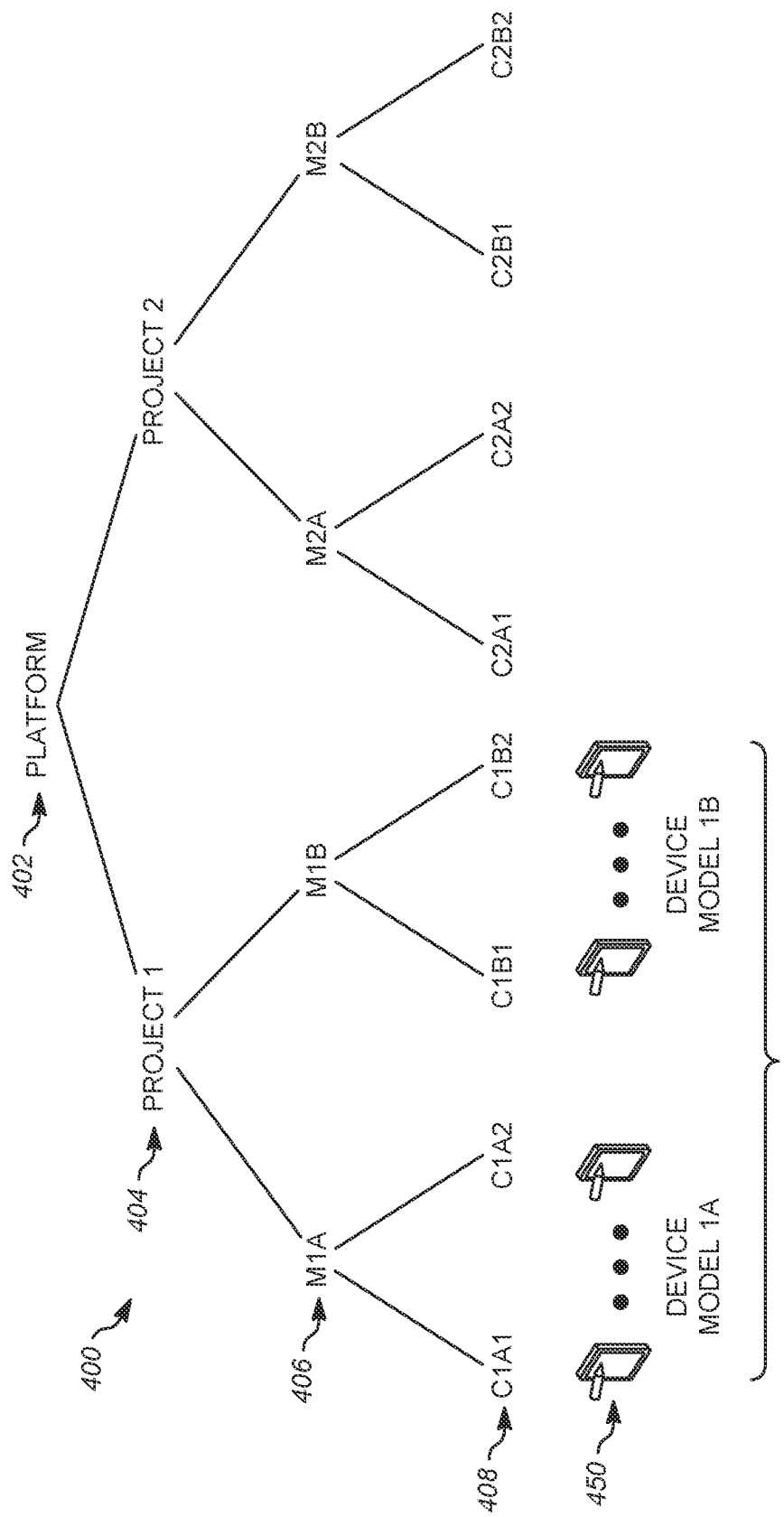
FIG. 4 is a diagram depicting a hierarchical organization (e.g. hierarchy) of a plurality of entities associated with data signing operations.

FIG. 4 is a diagram depicting a hierarchical organization (e.g. hierarchy 400) of a plurality of entities associated with data signing operations discussed above. The hierarchy 400 of entities includes, in decreasing hierarchical order, an application platform entity 402, at least one project entity 404 for each application platform entity 402, at least one model entity 406 for each project entity 404 and at least one configuration entity 408 for each model entity.

The application platform entity 402 may be evidenced by a corporate entity that manufactures or produces a plurality of devices 450, such as the assignee of this patent, COMMSCOPE, INC. A platform entity is defined as the highest hierarchical entity that organizes the data signing metadata/information for the fielded devices 450.

The project entity 404 typically comprises a family of devices 460 produced by the application platform entity 402. For example, the corporate entity COMMSCOPE may produce a first family of devices 460 such as set top boxes (STBs) for receiving satellite broadcasts (one project entity) and another family of devices 460 such as STBs for receiving cable broadcasts. Familial or group bounds can be defined as desired, but are typically defined to include products with analogous or similar functional requirements or functional architectures. For example, the project entity may be defined according to the functionality or source of the chip used in the devices 450—for example, those that use one particular digital telecommunication processing chip family belonging to one project and another digital telecommunication processing chip family in another project entity.

The model entity 406 can represent the particular models of the devices 450, for example models of satellite STBs and cable STBs. In the context of data signing, the model designation defines the how the signed data is to be installed on the devices 450 associated with the model entity 406. For example, a particular model of satellite STB may use a different technique for installing new data or code than a different model of the satellite STB. In the context of signing, the configuration entity defines the data to be installed on the devices 450.

For example, the satellite STB of the aforementioned example may include bootloader code (code that executes upon a system reboot that uploads and executes code and scripts), as well as application code. The one configuration entity may represent bootloader code, while a different configuration entity represents the application code.

Figure 5:
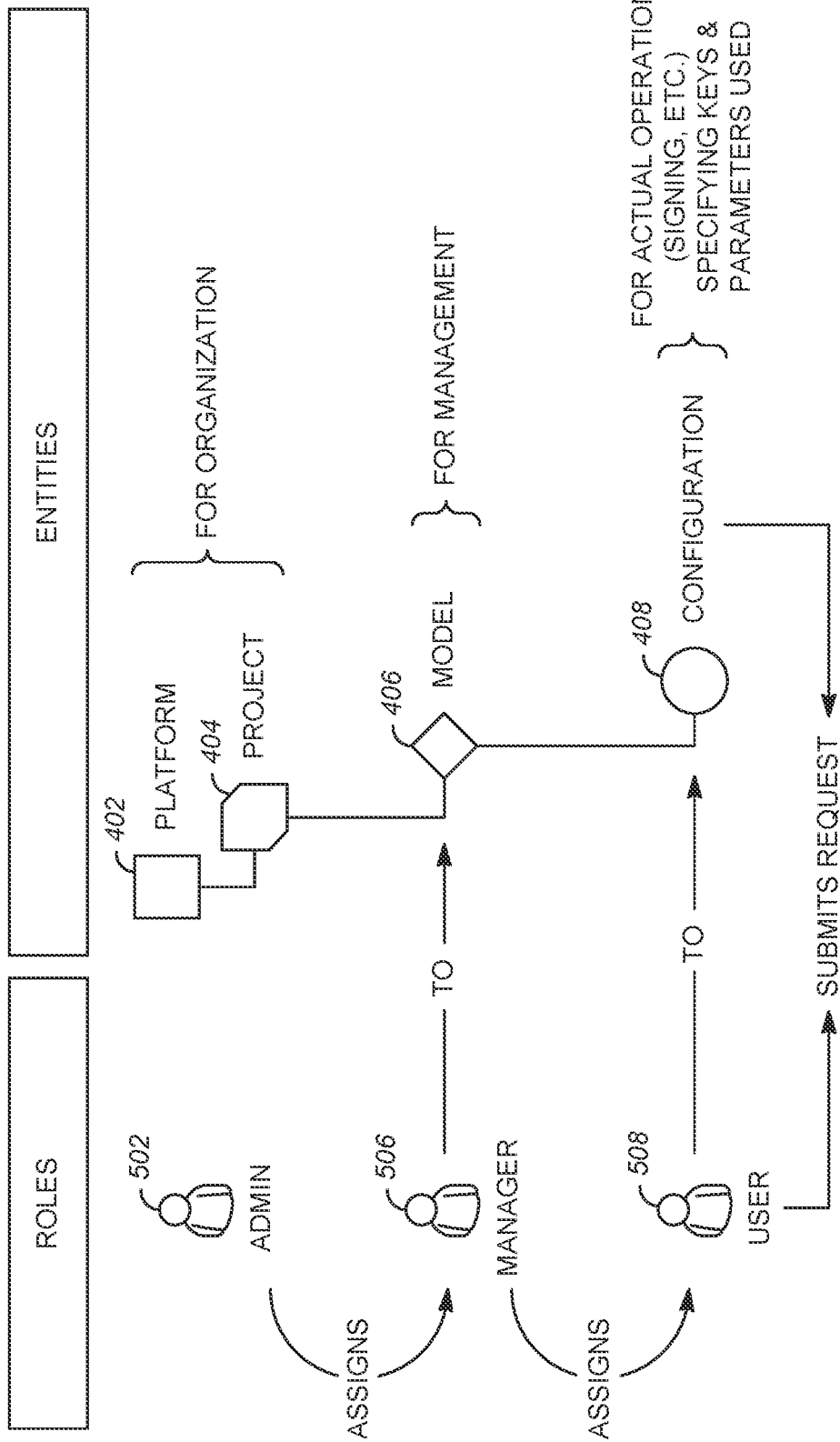
FIG. 5 is a diagram depicting the hierarchical organization and the user roles associated with those entities.

FIG. 5 is a diagram depicting the hierarchy 400 and the roles associated with those entities. A human user 103H having an administrator role 502 (hereinafter alternatively referred to as administrator 502) of the ODSS 100 is identified, and that administrator 502 is authorized to define the hierarchy of the entities in decreasing order, an application platform entity 402, at least one project entity 404 for each application platform entity 402, at least one model entity 406 for each project entity 404, and at least one configuration entity 408 for each model entity 406. The administrator 502 is also authorized to access and authorize access to any of the entities 402-408 and may also assign a human user 103H a manager role 506 (hereinafter alternatively referred to as manager 506) to another individual to manage a particular model entity 406. This human user 103H (the manager 506 of the model entity 406) is thus a human user 103H having the manager role 506 with respect to the associated model entity 406. This manager 506 is authorized to designate or assign human users 103H or machine users 103M user roles 508 to particular individuals for a particular configuration entity 408. This individual (herein alternatively referred to as a user 508 of a particular configuration entity 408) is thus a person having a user role 508 with respect to an associated configuration entity 408. In some implementations, managers 506 may not add users (this can be accomplished only by the ODSS administrator 502), but only authorize users to perform certain roles and grant them permissions to access specific configurations.

The configuration entity 408 holds information regarding the specific data signing operation such as signing keys, signature algorithm, file format, and other security parameters. Managers 506 are normally defined to have access to this configuration information for all the configurations under the manager's managed entity. Users 508 who have access to a configuration entity 408 can use it to perform the data signing activity according to the specified information/parameter but normally do not see the detailed information (e.g. keys, algorithms, and the like) itself.

Data Signing System Elements

Figure 6:
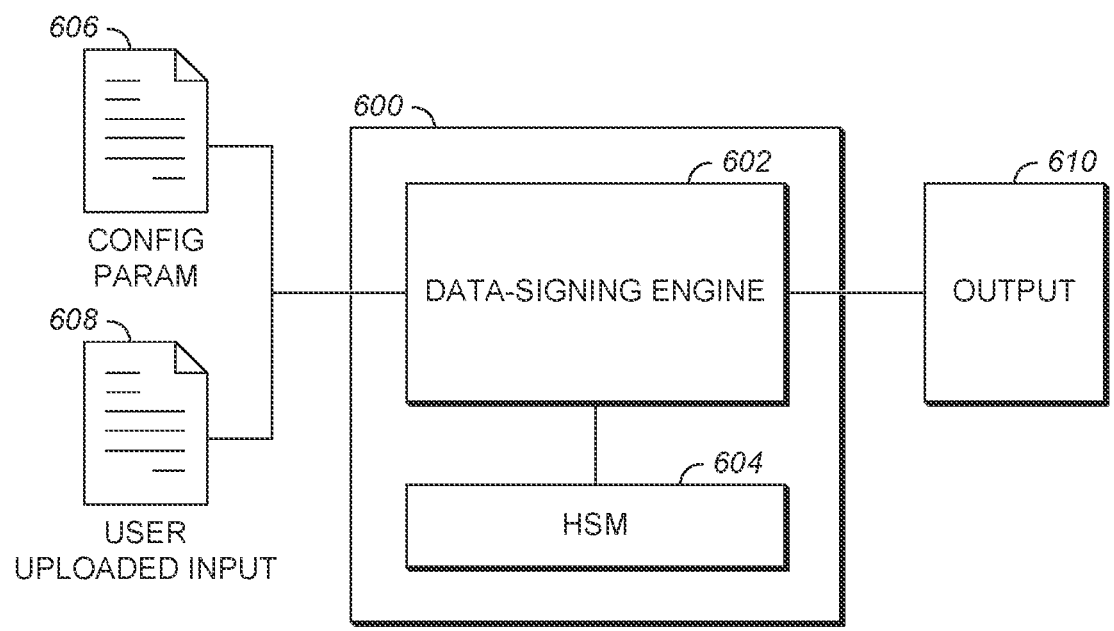
FIG. 6 is a diagram of elements of a general-purpose machine-to-machine data signing system.

FIG. 6 is a diagram of elements of a general purpose machine-to-machine data signing system 600. The system 600 comprises a data signing engine 602. In one embodiment, the data signing engine 602 has built in data signing operations implemented as "operation types." Operation types may include proprietary or standard crypto operations such as PKCS #1, PKCS #7. The system 600 may also include an HSM 604. Any cryptographic keys for signing and encryption are preferably protected in the HSM 604 accessible by the Data Signing Engine 602 via an application program interface (API).

Before a user 508 can use the data signing system 100, a "configuration" is defined (typically by a system administrator 502 described above). The configuration defines the operation type, the key, and any standard parameters defined by the operation type. For example, the PKCS #1 operation type may require an RSA signing key, and standard parameters may include the Endianness of the operation and what hashing algorithm to use (for example, SHA1 or SHA256).

Once the configuration is defined and authorized to a user 508, the user 508 can sign data by submitting a request with a pointer to the configuration and the input data image to the system. The data signing engine 602 accepts the configuration parameters 606 and the user uploaded input data to be signed 608, and executes the code implemented for that operation type over the configuration parameters and input image in the request, to create the final output image 610 to return to the client.

There are different ways to organize signing configurations. One such way is to use a hierarchy structure such as the one illustrated in FIG. 5, discussed above. The configurations are organized in a hierarchy structure starting from Platform 402, followed by project 404, model 406 and then the actual configurations 408. Users 103 of the data signing system may be assigned different roles. In this example, the administrator 502 is responsible for defining the various entities in the system and assigning a person having a user role 508 as also having a manager role 506 with respect to a model 406. The managers 506 are responsible for assigning users 508 (machine users 103M for example) to the actual signing configurations. And finally, machine users 103M can submit signing requests to authorized configurations to perform signing operations.

Providing Security Credentials Using Wrapped Keys

Figure 7:
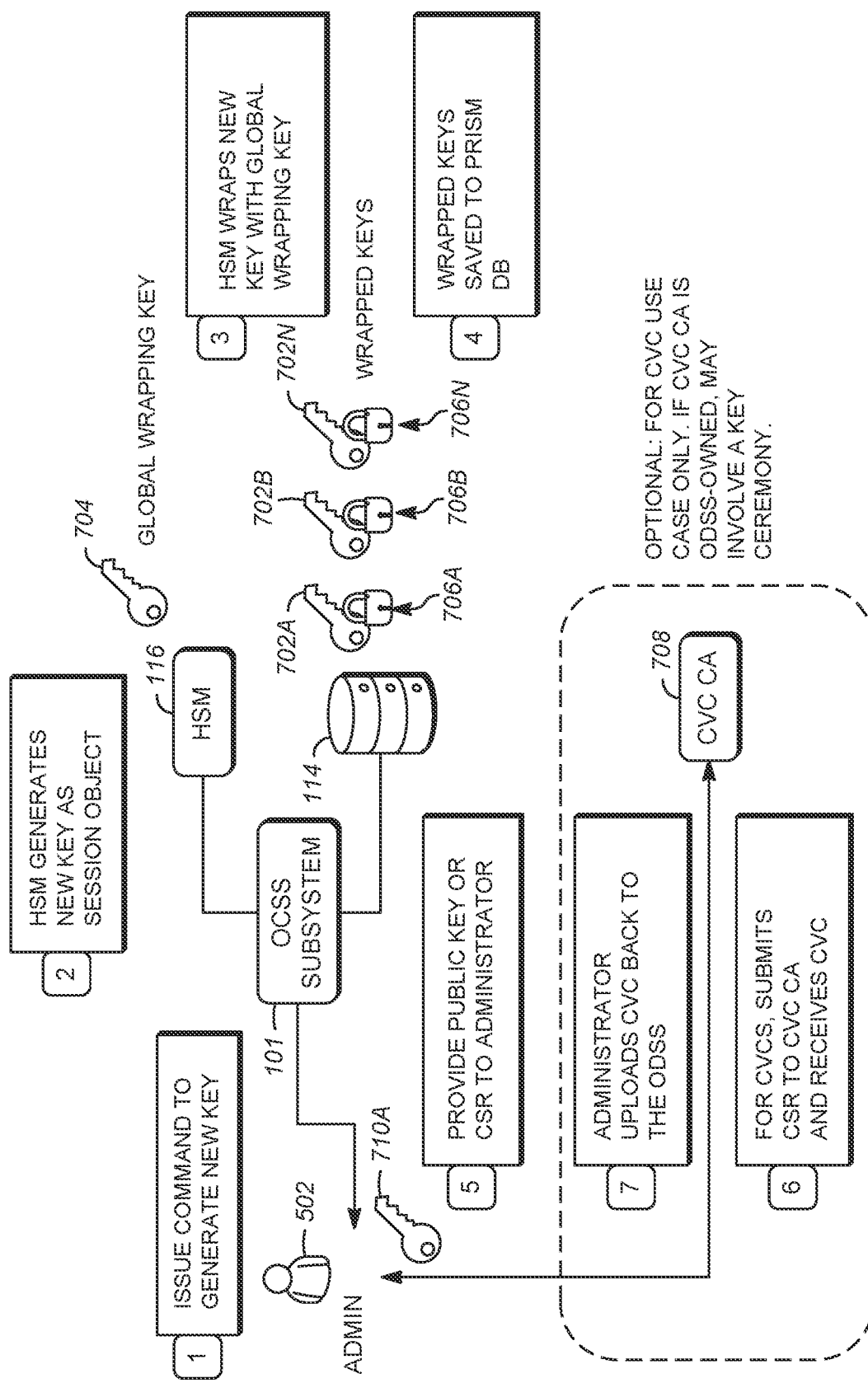
FIG. 7 is a diagram illustrating a technique for providing security credentials.

FIG. 7 is a diagram illustrating a technique for providing security credentials. FIG. 7 is discussed below in connection with FIG. 8, which is another diagram illustrating the technique for providing security credentials. An administrator 502 issues a command to the ODSS subsystem 101 to generate one or more keys 702A-702N. This is illustrated in step 1 of FIG. 7 and block 802 of FIG. 8. For purposes of simplicity of discussion, we assume that the administrator 502 has requested the generation of only one key, but the administrator 502 may request the generation of multiple keys with one request, and response, the ODSS subsystem 101 generates a plurality of keys and processes each key as described below for a single key.

Figure 8:
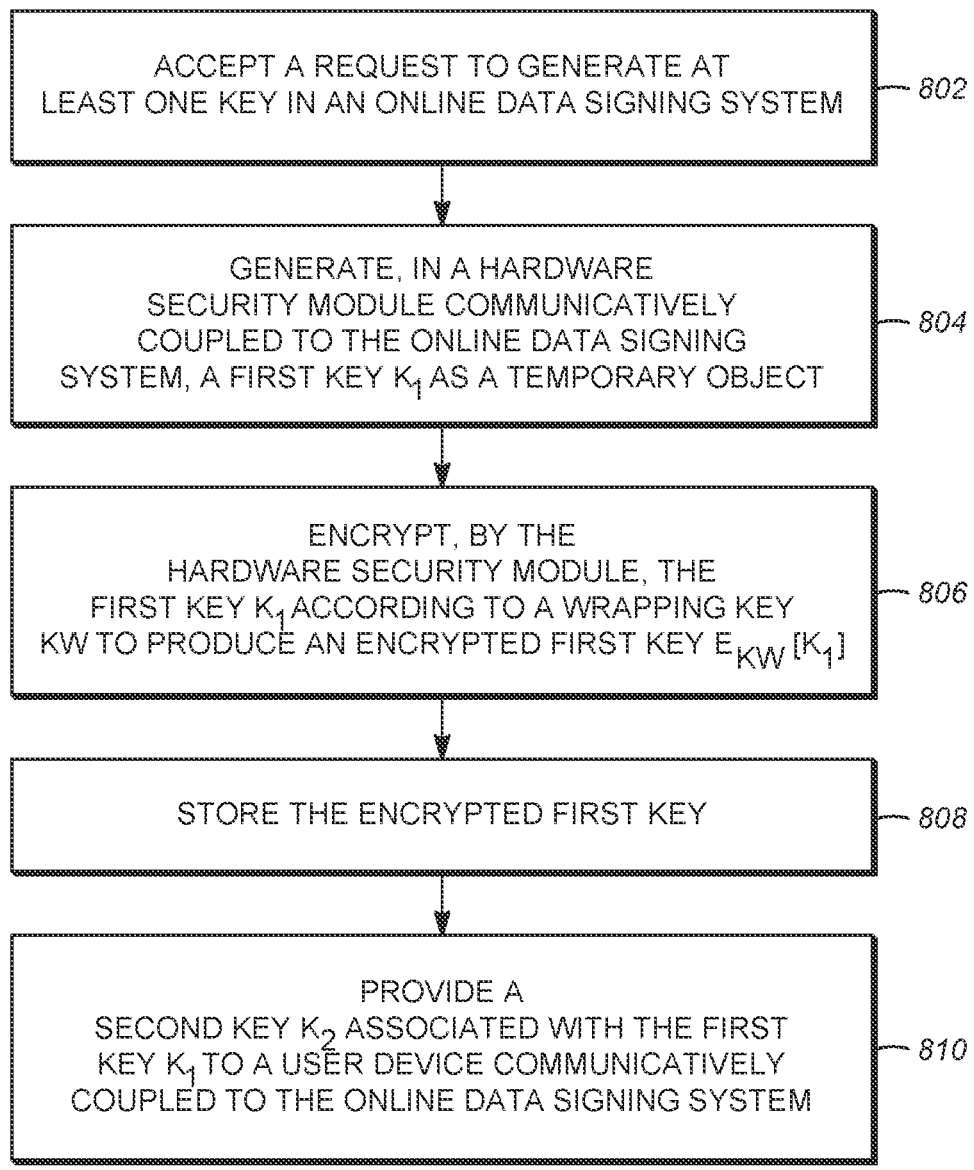
FIG. 8 is another diagram illustrating the technique for providing security credentials

The HSM 116 generates a first key $K_1$ 702A as a temporary object such as a session object, as shown in step 2 of FIG. 7 and block 804 of FIG. 8. Next, the HSM 116 wraps (e.g. encrypts) the first key $K_1$ 702A according to a wrapping key Kw 704 to produce an encrypted (or wrapped) first key $E_{K_w}[K_1]$ 706A, as shown in step 3 of FIG. 7 and block 806 of FIG. 8. The wrapped first key $E_{K_w}[K_1]$ 706A is then stored, for example, by saving it in the database 114, as shown in step 4 of FIG. 7 and block 808 of FIG. 8. The first key $K_1$ 702A may also be volitively stored in the HSM 116 as a session object as well. A second key $K_2$ 710 that is associated with the first key $K_1$ is then provided to a user device 108 as shown in block 810 of FIG. 8.

Several embodiments are envisioned. In a symmetric key embodiment, the first key $K_1$ 702A is a randomly generated symmetric key, and the second key $K_2$ 710 is that same key. Preferably, $K_2$ 710 is downloaded in encrypted form, e.g., encrypted with the user's PGP (Pretty Good Privacy) public key.

In an asymmetric key pair embodiment, the first key $K_1$ 702A is a private key (hereinafter alternatively $K_{Pr}$) and the second key is a public key 710A (hereinafter alternatively $K_{Pu}$) of a cryptographic key pair, which can be generated according to an RSA (Rivest-Shamir-Adleman) algorithm or an ECDSA (elliptic curve digital signature algorithm). RSA uses a prime factorization technique of determining the private key $K_{Pr}$ 702A and the public key $K_{Pu}$ 710A, generated from randomly chosen integers p and q. With ECDSA, an elliptic curve and elliptic curve base point are used to calculate the public key $K_{Pu}$ 710A from the private key $K_{Pr}$ 702A. In either the RSA or ECDSA case, the computed public key $K_{Pu}$ 710A is provided to the administrator 502, as shown in step 5 of FIG. 7.

In one embodiment of the asymmetric key pair example, the ODSS subsystem 101 simply provides the public key $K_{Pu}$ 710A to the user 508. In another embodiment, the public key $K_{Pu}$ 710A is provided as a part of a digital certificate generated by a CA. The CA may be part of the ODSS 100, or the CA may be a third-party CA 708 that generates a digital certificate from the public key $K_{Pu}$ and provides the generated digital certificate to the ODSS.

Figure 9:
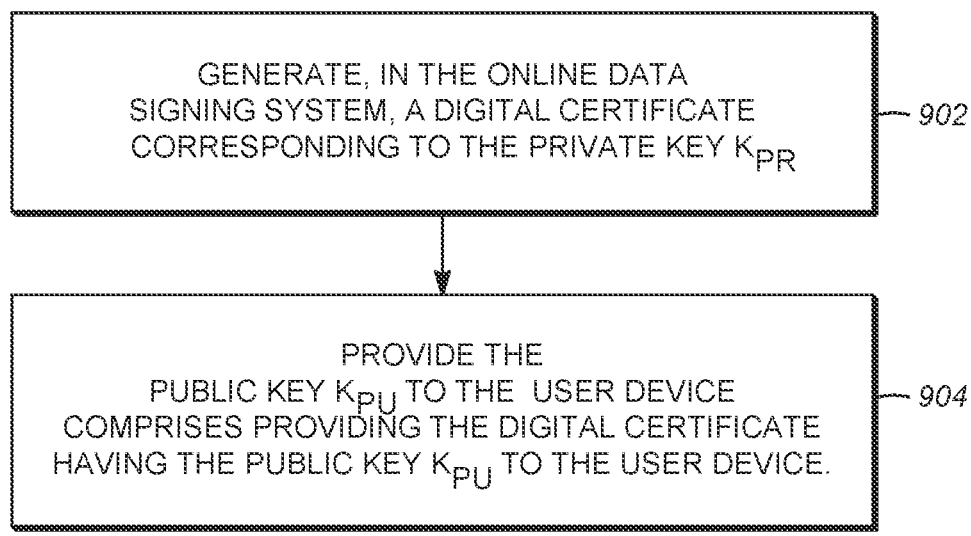
FIG. 9 is a diagram illustrating a first embodiment in which a certificate authority (CA) internal to the ODSS generates the digital certificate.

FIG. 9 is a diagram illustrating a first embodiment in which a CA internal to the ODSS 100 generates the digital certificate. In block 902, the digital certificate is generated by the ODSS based on the public key $K_{Pu}$, signed using the CVC CA 708. In block 904, an ODSS digital certificate generated in block 902 that includes the associated public key $K_{Pu}$ is stored in the ODSS database associated with the key pair. It is also made available for authorized users/administrators to download for later incorporation into a user device 108H or 108M.

Figure 10:
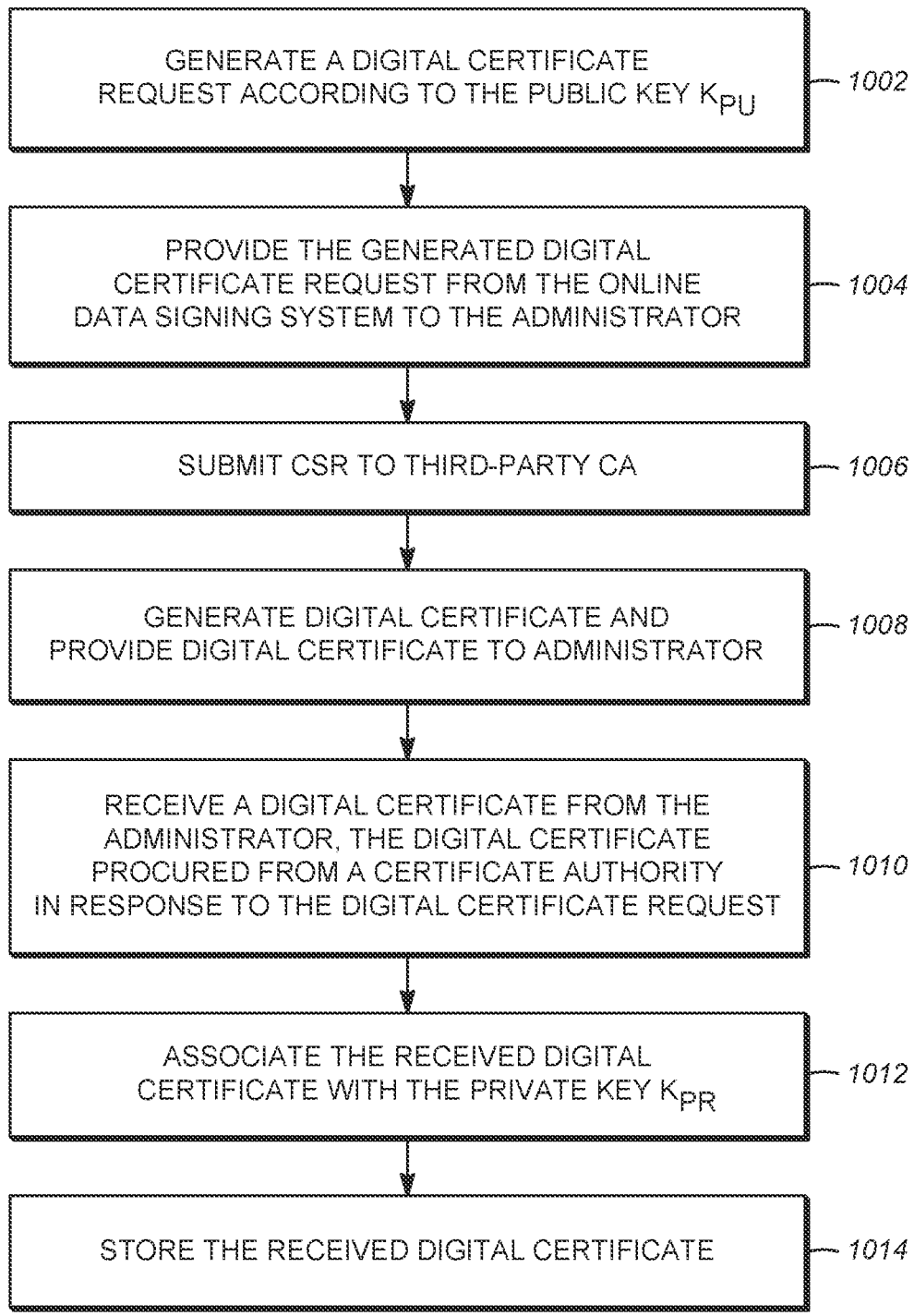
FIG. 10 is a diagram illustrating another embodiment in which an external CA the ODSS generates the digital certificate.

FIG. 10 is a diagram illustrating another embodiment in which an external CA 706 generates the digital certificate. In block 1002, a certificate signing request (CSR) is generated by the ODSS 100. The certificate signing request includes the public key $K_{Pu}$ 710A. In block 1004, the CSR is provided from the ODSS 100 to the administrator 502. The administrator 502 then submits the CSR to the third-party CA 708. This is illustrated in step 6 of FIG. 7 and block 1006 of FIG. 10. The third-party CA 708 generates the digital certificate and provides the certificate to the administrator 502, as shown in block 1010 of FIG. 10. In one embodiment, the digital certificate provided by the third-party CA 708 is a code verification certificate (CVC). In block 1006, the digital certificate procured from the certificate authority is received in the ODSS 100 from the administrator 502. In blocks 1008 and 1010 (and also as illustrated in step 7 of FIG. 7, the ODSS associates the received digital certificate with the first key $K_1$ (e.g. the private key $K_{Pr}$) 702A, and stores the received digital certificate.

Figure 11:
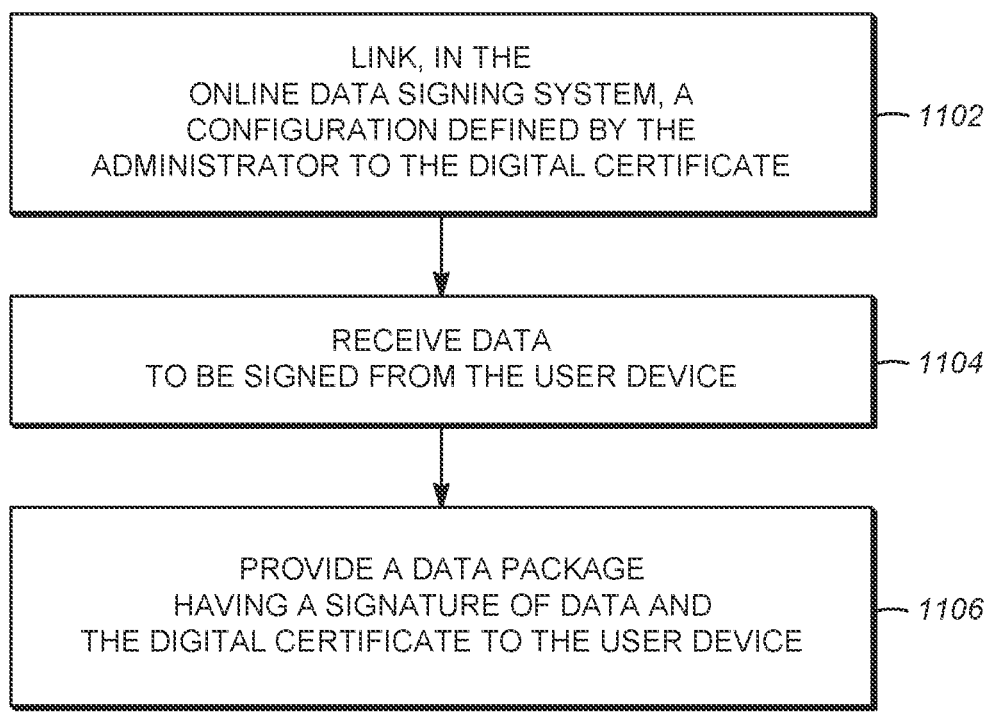
FIG. 11 is a diagram illustrating exemplary operations used to sign data using the ODSS.

FIG. 11 is a diagram illustrating exemplary operations used to sign data using the ODSS 100. In block 1102, a configuration defined by the administrator 502 is linked to the digital certificate received as described above. Such linking can be based, for example on the public key $K_{Pu}$ 710 of the digital certificate and the associated encrypted private key $E_{Kw}[K_{Pr}]$ 706A. In block 1104, the ODSS 100 receives data to be signed from the user 103. In block 1106, a data package having a signature of the data and the digital certificate is provided to the user 103.

Figure 12:
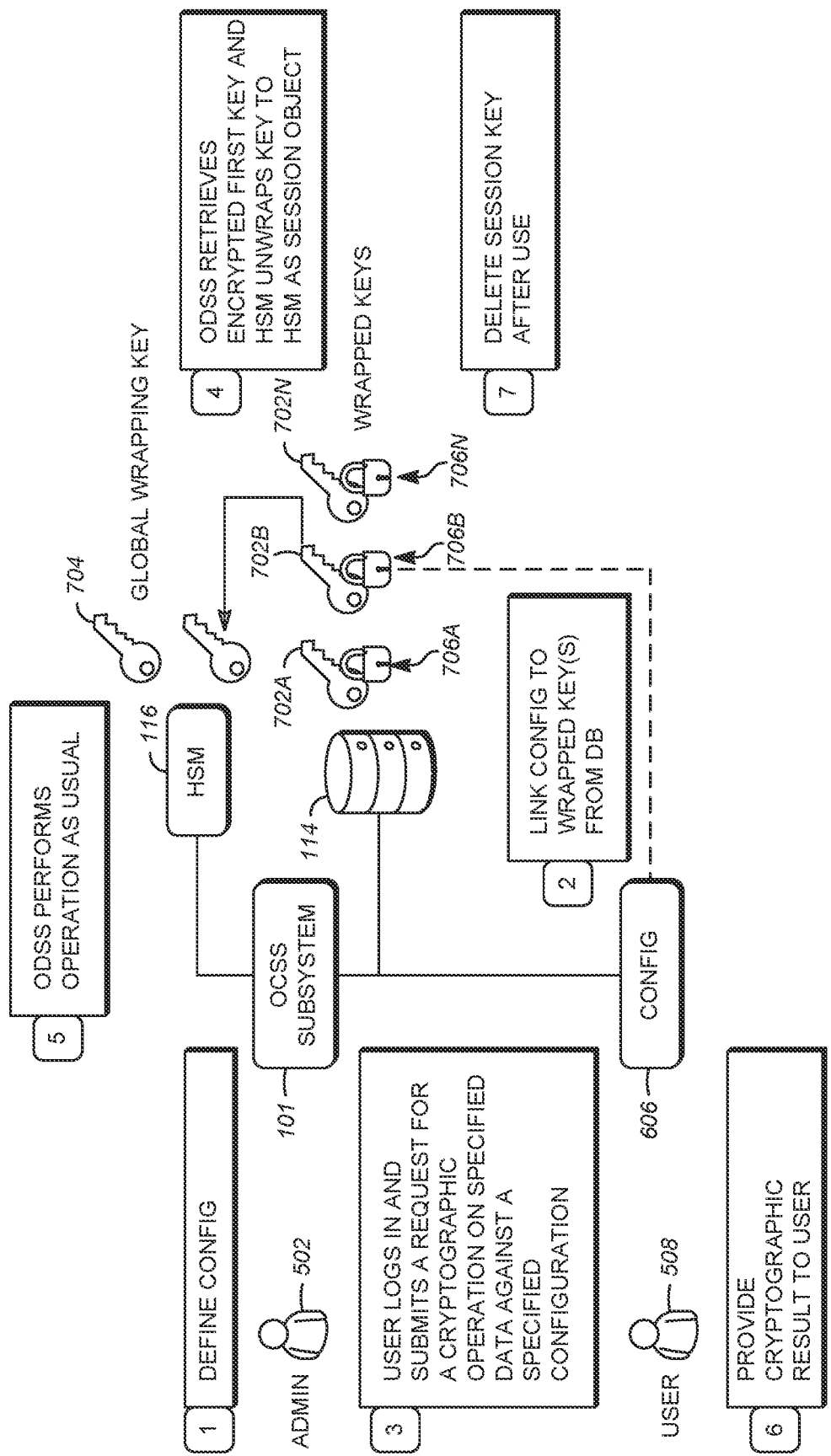
FIG. 12 is a diagram illustrating another embodiment of how the wrapped key can be used to sign data.
Figure 13:
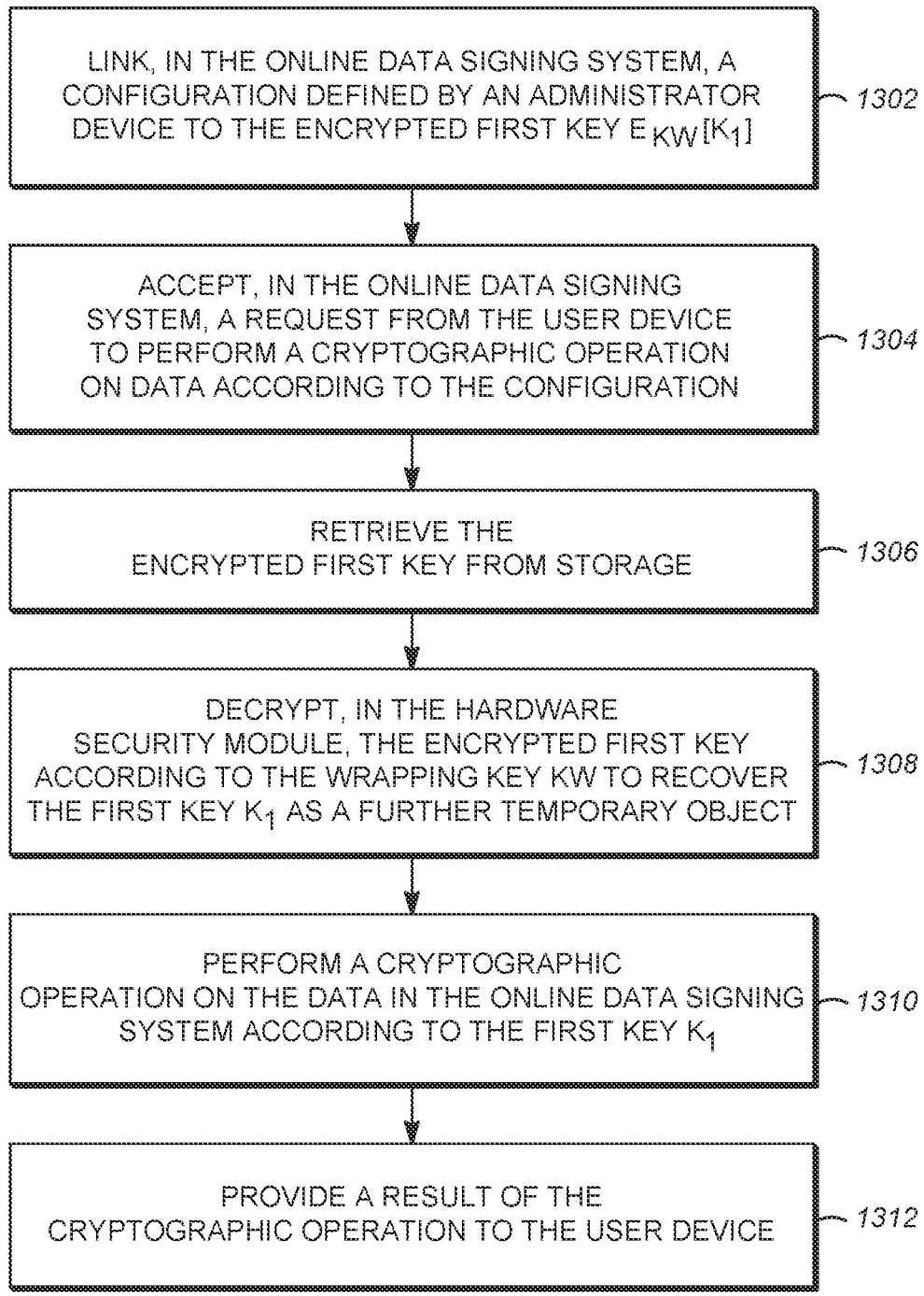
FIG. 13 is a diagram presenting exemplary operations for signing the data.

FIG. 12 is a diagram illustrating another embodiment of how the wrapped key $E_{Kw}[K_{Pr}]$ 706A can be used to sign data. FIG. 12 is discussed in connection with FIG. 13, which is a diagram presenting exemplary operations for signing the data.

In step 1 of FIG. 12, the administrator 502 defines the signing configuration by generating a configuration object having configuration parameters. In step 2 of FIG. 12 and block 1302 of FIG. 13, the defined configuration is linked to one of the wrapped keys 706A-706C stored in the database 114. In step 3 of FIG. 11, the user 508 logs in to the ODSS 100, accesses the configuration created by the administrator 502, and submits a request for the ODSS 100 to perform a cryptographic function on specified data according to the configuration. That request is accepted by the ODSS 100, as shown in block 1304 of FIG. 13. The ODSS 100 then uses the linking to determine which encrypted first key 706A is associated with the configuration, and retrieves that encrypted first key 706A, as shown in block 1306 of FIG. 13. Next, in step 4 of FIG. 12 and step 1308, the HSM 116 decrypts the encrypted first key $K_1$ 706A using the wrapping key 702 to recover the first key $K_1$ 702A. The first key $K_1$ is recovered as a temporary object (such as a session object), so that it is deleted when the session is completed. In block 1310 of FIG. 13 and step 5 of FIG. 12, the ODSS 100 performs the indicated operation. I in block 1312 of FIG. 13 and step 6 of FIG. 12, the ODSS 100 provides the result of the cryptographic operation to the user 103.

In one embodiment, the aforementioned cryptographic operation is a data signing operation that can be validated using the second key $K_2$ 710A In another embodiment, the cryptographic operation is an encryption operation using the first key $K_1$ 702A in which the data is encrypted so as to be decryptable using the second key $K_2$ 710A. The first key $K_1$ 702A and second key $K_2$ 710A may be an asymmetric key pair (e.g. the first key $K_1$ 702A being a private key and the second key $K_2$ 710A being a public key) or a symmetric key pair, where the first key $K_1$ 702A has the same value as the second key $K_2$ 710A Referring again to FIG. 12, in step 7, the first key $K_1$ 702A is deleted.

The foregoing discussion was based on the premise of the generation, encryption and storage of a single key, and the decryption and use of that single key. However, techniques discussed above can be applied to embodiments wherein a plurality of first keys and associated second keys are generated, rather than a single key and associated second key. In this embodiment, the operations depicted in block 802 now comprise accepting a request to generate a plurality of keys in the online data signing system, generating, in the hardware security module communicatively coupled to the online data signing system, the plurality of first keys $(K_{1,1}, K_{1,2}, \ldots K_{1,n})$ 702A-702N as temporary objects; encrypting, by the hardware security module, each of the plurality of first keys 702A-702N according to a global wrapping key Kw 704 to produce a plurality of encrypted first keys $E_{Kw}[K_{1,1}], E_{Kw}[K_{1,2}] \ldots E_{Kw}[K_{1,n}]$ 706A-706N, storing the plurality of encrypted first keys $E_{Kw}[K_{1,1}], E_{Kw}[K_{1,2}] \ldots E_{Kw}[K_{1,n}]$ 706A-706N, linking, in the online data signing system, a configuration defined by an administrator to each of the plurality of encrypted first keys $E_{Kw}[K_{1,1}], E_{Kw}[K_{1,2}] \ldots E_{Kw}[K_{1,n}]$ 706A-706N; retrieving the plurality of encrypted first keys $E_{Kw}[K_{1,1}], E_{Kw}[K_{1,2}] \ldots E_{Kw}[K_{1,n}]$ 706A-706N from storage; decrypting, in the hardware security module 116, each encrypted first key $E_{Kw}[K_{1,1}], E_{Kw}[K_{1,2}] \ldots E_{Kw}[K_{1,n}]$ 706A-706N according to the global wrapping key Kw 704 to recover each first key $(K_{1,1}, K_{1,2}, \ldots K_{1,n})$ 702A-702N as a further temporary object; performing a cryptographic operation on data with each first key ($K_{1,1}$, $K_{1,2}$, ... $K_{1,n}$) 702A-702N in the online data signing system; and providing a result of the cryptographic operation to the user 508.

There are a number of options with regard to when and under what circumstances the encrypted first key $K_1$ or keys $K_{1,1}$, $K_{1,2}$, ... $K_{1,n}$ 702A-702N may be decrypted and when the decrypted key $K_1$ or keys $K_{1,1}$, $K_{1,2}$, ... $K_{1,n}$ 702A-702N may be deleted from the HSM 116. One option is to unwrap (e.g. decrypt) the keys when they are needed and remove them from the HSM 116 immediately after use. This option can be implemented with simple logic, but the decryption and loading/unloading of the decrypted keys may impact processing performance.

Another option is to unwrap all of the wrapped keys 706A-706N when a data signing service of the ODSS subsystem 100 is started up and initialized (e.g. when the computer or other device that the HSM 116 is communicatively coupled to is started up. This option can be implemented with simple logic and permits more rapid processing, as the keys will be decrypted and ready for use when the cryptographic operation is requested by the user. However, many HSMs 116 have limited memory which may not be sufficient in order to fit all unwrapped keys 702A-702N.

Still another option is to unwrap the wrapped keys only when needed (e.g. in response to accepting a request from the user 508 to perform a cryptographic function that requires the unwrapped key). But in this embodiment ODSS 100 foregoes immediate removal of the unwrapped private keys 702A-702N after use. Instead, the unwrapped private keys 702A-702N may be retained in volatile memory of the HSM 116, and only deleted when the HSM 116 memory capacity is approached or reached. Which of the unwrapped private keys 702A-702N to remove may be determined in different ways. In one embodiment, the ODSS 100 keeps track of how often each decrypted private key 702A-702N is used, and deletes those decrypted keys 702A-702N which are used most infrequently until the HSM 116 is no longer in danger of running out of memory. In another embodiment, the ODSS 100 keeps track of the time at which each decrypted private key 702A-702N was used, and determines which private key(s) 702A-702N have been unused for the greatest time period, and those private keys are deleted. In still another embodiment, the decrypted keys 702A-702N are deleted on a first-in-first-out (FIFO) basis. This embodiment requires more complex logic, but will result in less frequent key loading, unloading, and decryption.

Hardware Environment

Figure 14:
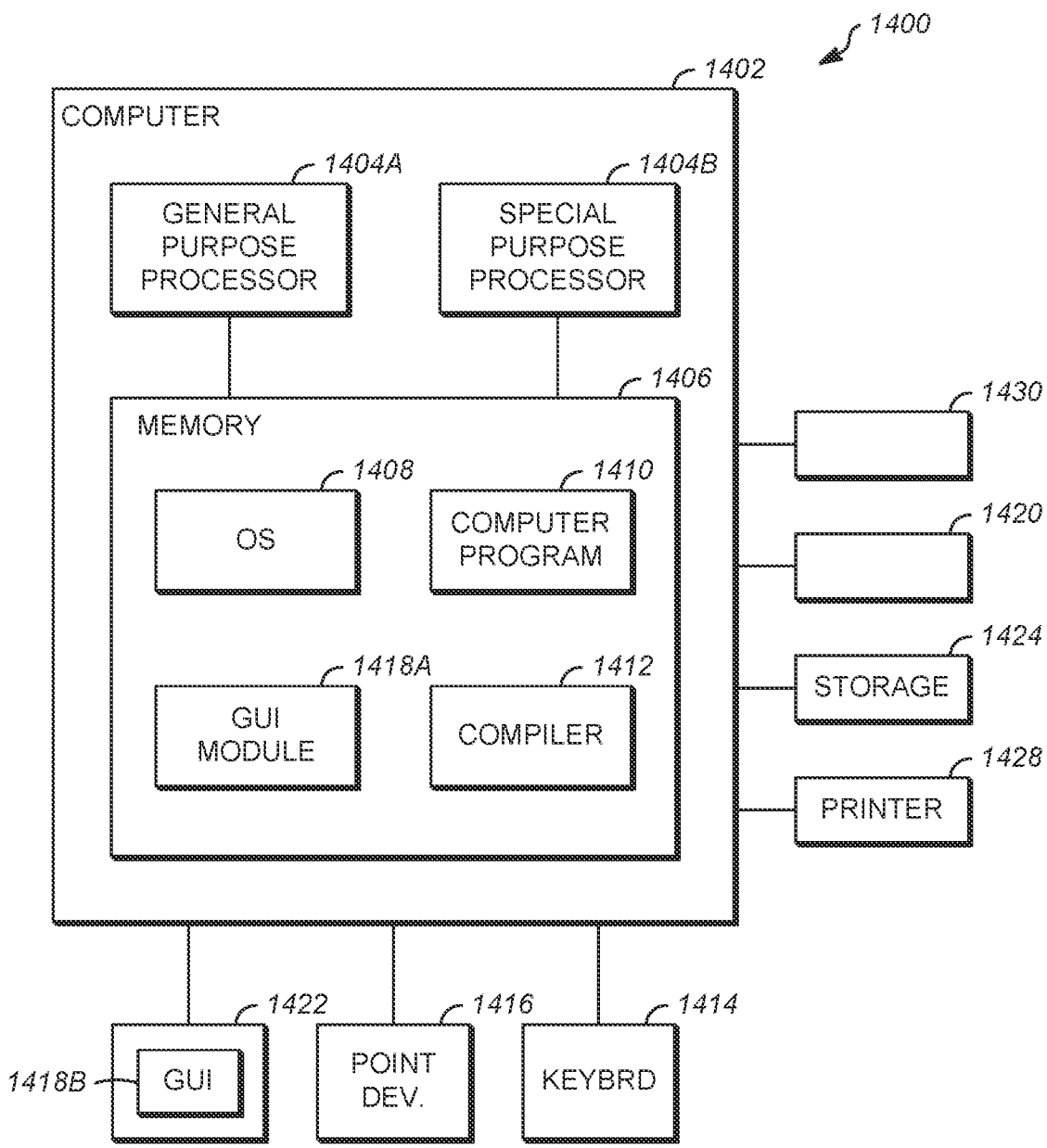
FIG. 14 illustrates an exemplary computer system that could be used to implement processing elements of the above disclosure.

FIG. 14 illustrates an exemplary computer system 1400 that could be used to implement processing elements of the above disclosure, including the ODSS frontend 102, the ODSS backend 104, database 114, HSM 116, user devices 108H and 108M, as well as computers used by the administrator 502, manager 506 and the user 508. The computer 1402 comprises a processor 1404 and a memory, such as random access memory (RAM) 1406. The computer 1402 is operatively coupled to a display 1422, which presents images such as windows to the user on a graphical user interface 1418B. The computer 1402 may be coupled to other devices, such as a keyboard 1414, a mouse device 1416, a printer 1428, etc. Of course, those skilled in the art will recognize that any combination of the above components, or any number of different components, peripherals, and other devices, may be used with the computer 1402.

Generally, the computer 1402 operates under control of an operating system 1408 stored in the memory 1406, and interfaces with the user to accept inputs and commands and to present results through a graphical user interface (GUI) module 1418A. Although the GUI module 1418B is depicted as a separate module, the instructions performing the GUI functions can be resident or distributed in the operating system 1408, the computer program 1410, or implemented with special purpose memory and processors. The computer 1402 also implements a compiler 1412 which allows an application program 1410 written in a programming language such as COBOL, C++, FORTRAN, or other language to be translated into processor 1404 readable code. After completion, the application 1410 accesses and manipulates data stored in the memory 1406 of the computer 1402 using the relationships and logic that was generated using the compiler 1412. The computer 1402 also optionally comprises an external communication device such as a modem, satellite link, Ethernet card, or other device for communicating with other computers.

In one embodiment, instructions implementing the operating system 1408, the computer program 1410, and the compiler 1412 are tangibly embodied in a computer-readable medium, e.g., data storage device 1420, which could include one or more fixed or removable data storage devices, such as a zip drive, floppy disc drive 1424, hard drive, CD-ROM drive, tape drive, etc. Further, the operating system 1408 and the computer program 1410 are comprised of instructions which, when read and executed by the computer 1402, causes the computer 1402 to perform the operations herein described. Computer program 1410 and/or operating instructions may also be tangibly embodied in memory 1406 and/or data communications devices 1430, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

The foregoing discloses a method of providing security credentials. In one embodiment, the method also includes accepting a request to generate at least one key in an online data signing system; generating, in a hardware security module communicatively coupled to the online data signing system, a first key as a temporary object; encrypting, by the hardware security module, the first key according to a wrapping key to produce an encrypted first key; storing the encrypted first key; providing a second key associated with the first key to a user device communicatively coupled to the online data signing system; linking, in the online data signing system, a configuration defined by an administrator to the encrypted first key; accepting, in the online data signing system, a request from the user device to perform a cryptographic operation on data according to the configuration; retrieving the encrypted first key from storage; decrypting, in the hardware security module, the encrypted first key according to the wrapping key to recover the first key as a further temporary object; performing a cryptographic operation on the data in the online data signing system according to the first key; and providing a result of the cryptographic operation to the user device. Other embodiments include corresponding computer systems, apparatus, and computer programs recorded on one or more computer storage devices, each configured to perform the actions of the methods.

Implementations may include one or more of the following features.

The method described above, wherein the first key is volitively stored in the hardware security module as a session object.

Any of the above methods wherein the first key is a private key; and the second key is a public key.

Any of the above methods wherein the public key is generated by the online data signing system at least in part from the private key.

Any of the above methods wherein the method further includes: generating, in the online data signing system, a digital certificate corresponding to the private key; and providing the public key to the user device may include providing the digital certificate having the public key to the a user device.

Any of the above methods wherein the method includes: generating a certificate signing request according to the public key; providing the generated certificate signing request from the online data signing system to the an administrator; receiving a digital certificate from the administrator, the digital certificate procured from a certificate authority in response to the certificate signing request; associating the received digital certificate with the private key; and storing the received digital certificate.

Any of the above methods wherein the digital certificate is uploaded by an administrator to the online data signing system; and the method further may include: linking, in the online data signing system, a configuration defined by the administrator to the digital certificate; receiving data to be signed from the user device; and providing a data package having a signature of data and the digital certificate to the user device.

Any of the above methods wherein the user device packages a signature of data obtained from the online data signing system together with the received digital certificate generate a signed data image for use by a target client system.

Any of the above methods wherein the cryptographic operation performed is a digital signing operation that can be validated using the second key.

Any of the above methods wherein the cryptographic operation is an encryption of the data, the encrypted data decryptable using the second key.

Any of the above methods wherein the decrypted first key is erased from the hardware security module following the performance of the cryptographic operation.

Any of the above methods wherein the decrypted first key is retained as a temporary object in a volatile memory of the hardware security module following the performance of the cryptographic operation; and the decrypted first key retained in volatile memory is reused for further cryptographic operations.

Any of the above methods wherein accepting a request to generate at least one key in an online data signing system may include: accepting a request to generate a plurality of keys in the online data signing system; generating, in a hardware security module communicatively coupled to the online data signing system, a first key as a temporary object may include: generating, in the hardware security module communicatively coupled to the online data signing system, a plurality of first keys as temporary objects; encrypting, by the hardware security module, the first key according to a wrapping key kw to produce an encrypted first key may include: encrypting, by the hardware security module, each of the plurality of first keys according to a global wrapping key kw to produce a plurality of encrypted first keys; storing the encrypted first key may include: storing the plurality of encrypted first keys; and linking, in the online data signing system, a configuration defined by an administrator to the encrypted first key may include: linking, in the online data signing system, a configuration defined by an administrator to each of the plurality of encrypted first keys; retrieving the encrypted first key from storage may include: retrieving the plurality of encrypted first keys from storage; decrypting, in the hardware security module, the encrypted first key according to the wrapping key kw to recover the first key as a further temporary object may include: decrypting, in the hardware security module, each encrypted first key according to the global wrapping key kw to recover each first key as a further temporary object; and performing a cryptographic operation on the data in the online data signing system according to the first key may include: performing a cryptographic operation on data with each first key in the online data signing system.

Any of the above methods wherein the decryption of each encrypted first key is performed during startup and initialization of the online data signing system.

Any of the above methods wherein the method further includes accepting, in the online data signing system, a request from the user device to perform a cryptographic operation on the data according to the configuration; and the decryption of each encrypted first key is performed in response to the accepting of the request from the user device.

Any of the above methods wherein the first key is a symmetric randomly generated key; and the second key is identical to the first key. Implementations of the described techniques may include hardware, a method or process, or computer software on a computer-accessible medium.

Another embodiment is evidenced by an apparatus that includes a processor; a memory, communicatively coupled to the processor, the memory storing processor instructions may include processor instructions for: accepting a request to generate at least one key in an online data signing system; generating, in a hardware security module communicatively coupled to the online data signing system, a first key as a temporary object; encrypting, by the hardware security module, the first key according to a wrapping key kw to produce an encrypted first key; storing the encrypted first key; providing a second key associated with the first key to a user device communicatively coupled to the online data signing system; linking, in the online data signing system, a configuration defined by an administrator to the encrypted first key; accepting, in the online data signing system, a request from the user device to perform a cryptographic operation on data according to the configuration; retrieving the encrypted first key from storage; decrypting, in the hardware security module, the encrypted first key according to the wrapping key kw to recover the first key as a further temporary object; performing a cryptographic operation on the data in the online data signing system according to the first key; and providing a result of the cryptographic operation to the user device. Other embodiments of this aspect include corresponding computer systems, apparatus, and computer programs recorded on one or more computer storage devices, each configured to perform the actions of the methods.

What is claimed is:

1. A method of providing security credentials, comprising:
accepting a request to generate at least one key in an online data signing system;
generating, in a hardware security module communicatively coupled to the online data signing system, a first key $K_1$ as a temporary object;
encrypting, by the hardware security module, the first key $K_1$ according to a wrapping key Kw to produce an encrypted first key $E_{Kw}[K_1]$;
storing the encrypted first key;
providing a second key $K_2$ associated with the first key $K_1$ to a user device communicatively coupled to the online data signing system;
linking, in the online data signing system, a configuration defined by an administrator to the encrypted first key $E_{Kw}[K_1]$;
accepting, in the online data signing system, a request from the user device to perform a cryptographic operation on data according to the configuration;
retrieving the encrypted first key;
decrypting, in the hardware security module, the encrypted first key according to the wrapping key Kw to recover the first key $K_1$ as a second temporary object;
performing the cryptographic operation on the data in the online data signing system according to the first key $K_1$; and
providing a result of the cryptographic operation to the user device.

2. The method of claim 1, wherein the first key $K_1$ is volitively stored in the hardware security module as a session object.

3. The method of claim 1, wherein:
the first key $K_1$ is a private key $K_{Pr}$; and
the second key $K_2$ is a public key $K_{pu}$.

4. The method of claim 3, wherein:
the public key $K_{pu}$ is generated by the online data signing system at least in part from the private key $K_{Pr}$.

5. The method of claim 3, further comprising:
generating, in the online data signing system, a digital certificate corresponding to the private key $K_{Pr}$; and
providing the public key $K_{Pu}$ to the user device comprises providing the digital certificate having the public key $K_{Pu}$ to the a user device.

6. The method of claim 3, further comprising:
generating a certificate signing request according to the public key $K_{Pu}$;
providing the generated certificate signing request from the online data signing system to the an administrator;
receiving a digital certificate from the administrator, the digital certificate procured from a certificate authority in response to the certificate signing request;
associating the received digital certificate with the private key $K_{Pr}$; and
storing the received digital certificate.

7. The method of claim 6, wherein:
the digital certificate is uploaded by an administrator to the online data signing system; and
the method further comprises:
linking, in the online data signing system, a configuration defined by the administrator to the digital certificate;
receiving data to be signed from the user device; and
providing a data package having a signature of data and the digital certificate to the user device.

8. The method of claim 6, wherein:
the user device packages a signature of data obtained from the online data signing system together with the received digital certificate generate a signed data image for use by a target client system.

9. The method of claim 1, wherein:
the cryptographic operation performed is a digital signing operation that can be validated using the second key.

10. The method of claim 1, wherein:
the cryptographic operation is an encryption of the data, the encrypted data decryptable using the second key.

11. The method of claim 1, wherein:
the decrypted first key is erased from the hardware security module following the performance of the cryptographic operation.

12. The method of claim 1, wherein:
the decrypted first key $K_1$ is retained as a temporary object in a volatile memory of the hardware security module following the performance of the cryptographic operation; and
the decrypted first key $K_1$ retained in volatile memory is reused for further cryptographic operations.

13. The method of claim 1, wherein:
accepting a request to generate at least one key in the online data signing system comprises:
accepting a request to generate a plurality of keys in the online data signing system;
generating, in a hardware security module communicatively coupled to the online data signing system, a first key $K_1$ as a temporary object comprises:
generating, in the hardware security module communicatively coupled to the online data signing system, a plurality of first keys $(K_{1,1}, K_{1,2}, \ldots K_{1,n})$ as temporary objects;
encrypting, by the hardware security module, the first key $K_1$ according to a wrapping key Kw to produce an encrypted first key $E_{Kw}[K_1]$ comprises:
encrypting, by the hardware security module, each of the plurality of first keys $(K_{1,1}, K_{1,2}, \ldots K_{1,n})$ according to a global wrapping key Kw to produce a plurality of encrypted first keys $E_{Kw}[K_{1,1}], E_{Kw}[K_{1,2},] \ldots E_{Kw}[K_{1,n}]$;
storing the encrypted first key comprises:
storing the plurality of encrypted first keys $E_{Kw}[K_{1,1}], E_{Kw}[K_{1,2},] \ldots E_{Kw}[K_{1,n}]$; and
linking, in the online data signing system, a configuration defined by an administrator to the encrypted first key $E_{Kw}[K_1]$ comprises:
linking, in the online data signing system, a configuration defined by an administrator to each of the plurality of encrypted first keys $E_{Kw}[K_{1,1}], E_{Kw}[K_{1,2},] \ldots E_{Kw}[K_{1,n}]$;
retrieving the encrypted first key comprises:
retrieving the plurality of encrypted first keys $E_{Kw}[K_{1,1}], E_{Kw}[K_{1,2},] \ldots E_{Kw}[K_{1,n}]$;

decrypting, in the hardware security module, the encrypted first key according to the wrapping key Kw to recover the first key $K_1$ as a second temporary object comprises:

decrypting, in the hardware security module, each encrypted first key $E_{Kw}[K_{1,1}], E_{Kw}[K_{1,2},] \ldots E_{Kw}[K_{1,n}]$ according to the global wrapping key Kw to recover each first key $(K_{1,1}, K_{1,2}, \ldots K_{1,n})$ as an additional temporary object; and performing a cryptographic operation on the data in the online data signing system according to the first key $K_1$ comprises:

performing the cryptographic operation on data with each first key $(K_{1,1}, K_{1,2}, \ldots K_{1,n})$ in the online data signing system.

14. The method of claim 13, wherein:

the decryption of each encrypted first key $E_{Kw}[K_{1,1}], E_{Kw}[K_{1,2},] \ldots E_{Kw}[K_{1,n}]$ is performed during startup and initialization of the online data signing system.

15. The method of claim 13, wherein:

the method further comprises accepting, in the online data signing system, a request from the user device to perform a cryptographic operation on the data according to the configuration; and the decryption of each encrypted first key $E_{Kw}[K_{1,1}], E_{Kw}[K_{1,2},] \ldots E_{Kw}[K_{1,n}]$ is performed in response to the accepting of the request from the user device.

16. The method of claim 1, wherein:

the first key $K_1$ is a symmetric randomly generated key; and the second key $K_2$ is identical to the first key.

17. An apparatus for providing security credentials, comprising:

a processor;

a memory, communicatively coupled to the processor, the memory storing processor instructions comprising processor instructions for:

accepting a request to generate at least one key in an online data signing system;

generating, in a hardware security module communicatively coupled to the online data signing system, a first key $K_1$ as a temporary object;

encrypting, by the hardware security module, the first key $K_1$ according to a wrapping key Kw to produce an encrypted first key $E_{Kw}[K_1]$;

storing the encrypted first key;

providing a second key $K_2$ associated with the first key $K_1$ to a user device communicatively coupled to the online data signing system;

linking, in the online data signing system, a configuration defined by an administrator to the encrypted first key $E_{Kw}[K_1]$;

accepting, in the online data signing system, a request from the user device to perform a cryptographic operation on data according to the configuration;

retrieving the encrypted first key;

decrypting, in the hardware security module, the encrypted first key according to the wrapping key Kw to recover the first key $K_1$ as a second temporary object;

performing the cryptographic operation on the data in the online data signing system according to the first key $K_1$; and providing a result of the cryptographic operation to the user device.

18. The apparatus of claim 17, wherein:

the first key $K_1$ is a private key $K_{Pr}$;

the second key $K_2$ is a public key $K_{pu}$;

the processor instructions further comprise processor instructions for:

generating, in the online data signing system, a digital certificate corresponding to the private key $K_{Pr}$; and providing the public key $K_{Pu}$ to the user device comprises providing the digital certificate having the public key $K_{Pu}$ to a user device.

19. The apparatus of claim 18, wherein:

the first key $K_1$ is a private key $K_{Pr}$;

the second key $K_2$ is a public key $K_{pu}$;

the processor instructions further comprise processor instructions for:

generating a certificate signing request according to the public key $K_{Pu}$;

providing the generated certificate signing request from the online data signing system to the an administrator;

receiving a digital certificate from the administrator, the digital certificate procured from a certificate authority in response to the certificate signing request;

associating the received digital certificate with the private key $K_{Pr}$; and storing the received digital certificate.

* * * * *